United States Patent
Johnston (10) Patent No.: US 12,065,265 B2
(45) Date of Patent: Aug. 20, 2024

(54) AIRCRAFT WING GANTRY SYSTEM

(71) Applicant: Daniel Johnston, Redington Beach, FL (US)

(72) Inventor: Daniel Johnston, Redington Beach, FL (US)

(*) Notice: Subject to any disclaimer, the term of this patent is extended or adjusted under 35 U.S.C. 154(b) by 1164 days.

(21) Appl. No.: 16/820,244

(22) Filed: Mar. 16, 2020

(65) Prior Publication Data

US 2021/0284360 A1    Sep. 16, 2021

(51) Int. Cl.
| | | |
|---|---|---|
| *B64F 5/40* | (2017.01) | |
| *E04G 1/24* | (2006.01) | |
| *E04G 1/36* | (2006.01) | |
| *E04G 5/00* | (2006.01) | |
| *E04G 5/14* | (2006.01) | |

(52) U.S. Cl.
CPC ............... *B64F 5/40* (2017.01); *E04G 1/24* (2013.01); *E04G 1/36* (2013.01); *E04G 5/00* (2013.01); *E04G 5/14* (2013.01); *E04G 2001/242* (2013.01)

(58) Field of Classification Search
CPC ..... B64F 5/40; B64F 5/60; E04G 1/24; E04G 1/28; E04G 1/36; E04G 3/28; E04G 3/243; E04G 2003/286; E04G 2001/242; B66F 11/00; B66F 11/04
See application file for complete search history.

(56) References Cited

U.S. PATENT DOCUMENTS

| | | | | |
|---|---|---|---|---|
| 1,538,437 A | * | 5/1925 | Larsen | B66F 7/243 |
| | | | | 104/126 |
| 2,337,674 A | * | 12/1943 | Miller | B63C 5/02 |
| | | | | 182/132 |

(Continued)

FOREIGN PATENT DOCUMENTS

| | | |
|---|---|---|
| BR | 102018009536-6 A2 | 1/2019 |
| CN | 103063390 A | 4/2013 |

(Continued)

OTHER PUBLICATIONS

International Search Report and Written Opinion of the International Searching Authority in PCT/US2021/018115, dated Jun. 25, 2021, 11 pages.

(Continued)

*Primary Examiner* — Colleen M Chavchavadze
(74) *Attorney, Agent, or Firm* — Lempia Summerfield Katz LLC (57) ABSTRACT

A moveable wing gantry for servicing a wing of an aircraft is configured to be positioned around a wing of an aircraft to provide access to overwing and underwing surfaces of the wing of the aircraft. The wing gantry includes a service deck positioned underneath the wing of the aircraft. An operator platform is moveably attached to the service deck and operable to move along the length of the service deck. A chair support is moveably attached to the operator platform and operable to move across the operator platform in a direction substantially perpendicular to the length of the service deck. The wing gantry includes a pivotable span platform positioned above the wing of the aircraft and pivotable between a raised position and a lowered position. The wing gantry is customizable to different aircraft wing types and styles.

8 Claims, 6 Drawing Sheets

(56) References Cited

U.S. PATENT DOCUMENTS

| | | | | |
|---|---|---|---|---|
| 2,828,166 | A | * | 3/1958 | Herring ............... B64F 5/50 |
| | | | | 182/115 |
| 3,085,285 | A | * | 4/1963 | Morlik ............... E04G 5/02 |
| | | | | 280/771 |
| 3,256,955 | A | * | 6/1966 | Izmirian ............... B64F 5/40 |
| | | | | 182/180.1 |
| 3,460,177 | A | * | 8/1969 | Rhinehart ............ B08B 1/00 |
| | | | | 244/114 R |
| 3,524,207 | A | | 8/1970 | Giarretto |
| 3,831,709 | A | * | 8/1974 | Stanford ............... B64F 5/60 |
| | | | | 180/125 |
| 4,235,305 | A | | 11/1980 | Nygren |
| 4,821,845 | A | | 4/1989 | Deviaris |
| 5,165,504 | A | | 11/1992 | Lecorre |
| 5,248,341 | A | | 9/1993 | Berry, Jr. et al. |
| 5,363,940 | A | * | 11/1994 | Fahrion ............... B64F 5/10 |
| | | | | 182/115 |
| 5,375,283 | A | * | 12/1994 | Silberman ............ B64F 5/60 |
| | | | | 182/130 |
| 5,423,396 | A | * | 6/1995 | Fahrion ............... B64F 5/10 |
| | | | | 182/115 |
| 5,701,704 | A | | 12/1997 | Landes |
| 5,992,565 | A | * | 11/1999 | Lingen ............... B66C 23/283 |
| | | | | 182/141 |
| 6,782,665 | B2 | | 8/2004 | Fahrion |
| 8,453,577 | B2 | * | 6/2013 | Gordon ............... A63G 7/00 |
| | | | | 104/53 |
| 9,579,679 | B2 | | 2/2017 | Mathis |
| 2003/0178253 | A1 | * | 9/2003 | Tatge ............... E04G 5/061 |
| | | | | 182/132 |
| 2004/0115034 | A1 | * | 6/2004 | Arijoki ............... B65G 69/24 |
| | | | | 414/495 |

FOREIGN PATENT DOCUMENTS

| | | |
|---|---|---|
| CN | 206407871 U | 8/2017 |
| CN | 109094815 A | 12/2018 |
| EP | 0455371 A2 | 11/1991 |
| JP | 2015224029 A | 12/2015 |
| WO | 9600166 A1 | 1/1996 |

OTHER PUBLICATIONS

International Search Report and Written Opinion of the International Searching Authority in PCT/US2021/021881, dated May 27, 2021, 9 pages.

Extended European Search Report from European Patent Application No. 21772493, dated Feb. 12, 2024, 8 pages.

* cited by examiner

AIRCRAFT WING GANTRY SYSTEM

FIELD

The following disclosure relates to a gantry system for servicing a wing of an aircraft.

BACKGROUND

In the aircraft maintenance, repair and overhaul (MRO) industry, such as the aircraft painting business, explosion-proof equipment such as boom and scissor lifts are used to prepare and service, such as paint, new and used aircraft. However, booms and scissor lifts may cause damage to aircrafts being serviced. Collisions of the booms or lifts with the aircraft result in undesired damage, costs, and delay.

Roof-mounted systems have been attempted to reduce the risk of damage. However, the roof-mounted systems are overly expensive.

SUMMARY

By way of introduction, the preferred embodiments described below include apparatuses, systems, and methods for an aircraft wing gantry system for servicing a wing of an aircraft. A floor supported moveable gantry includes a service deck to be positioned underneath the wing of the aircraft to provide access to underwing surfaces of the wing. A platform is connected to the top of the service deck and moves along the service deck to provide access to the overwing surfaces of the wing. In this way, underwing and overwing access is provided for MRO while reducing risk of damage.

In a first aspect, an apparatus for servicing a wing of an aircraft is provided. The apparatus includes a moveable support and service deck. The service deck is attached to the moveable support and is configured to be positioned underneath the wing of the aircraft. The service deck includes a railing along a length of the service deck. The service deck also includes an operator platform moveably attached to the service deck and operable to translate along the length of the service deck. The service deck also includes a chair support moveably mounted to the operator platform and operable to translate across the operator platform in a direction substantially perpendicular to the length of the service deck, such that the chair support provides access to different positions underneath the wing of the aircraft.

In a second aspect, an aircraft wing gantry system is provided. The aircraft wing gantry system includes a plurality of gantries, a service deck, a platform, and a plurality of wheels. The plurality of gantries are configured to be positioned around a wing of an aircraft, such that the plurality of gantries provide access to overwing and underwing surfaces of the wing of the aircraft. The service deck is attached to at least one gantry of the plurality of gantries and configured to be positioned underneath the wing of the aircraft, such that the service deck provides access to the underwing surfaces of the wing of the aircraft. The platform is tiltably attached to the service deck of the at least one gantry. The platform is tiltable between a raised position and a lowered position, such that when the platform is in the raised position the at least one gantry is operable to be positioned around the wing of the aircraft and when the platform is in the lowered position the platform provides access to the overwing surfaces of the wing of the aircraft. The plurality of wheels are attached to the plurality of gantries such that the plurality of gantries are moveable to surround the wing of the aircraft.

In a third aspect, a method of setting up an aircraft wing gantry is provided. The method includes positioning the aircraft wing gantry around a wing of an aircraft, such that a service deck of the aircraft wing gantry is positioned underneath the wing of the aircraft and the wing of the aircraft is positioned in between opposing rails of the service deck. The method also includes lowering a platform pivotably attached to one rail of the opposing rails of the service deck, such that when the platform is lowered the platform is positioned above the wing of the aircraft and spans across a width of the wing of the aircraft. The platform is operable to translate along the opposing rails of the service deck. The method also includes stabilizing the aircraft wing gantry in place once positioned.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The present embodiments generally relate to a moveable gantry system for aircraft maintenance, repair and overhaul (MRO). In order for personnel to perform MRO activities, such as painting an aircraft wing, personnel often need to work in close proximity to the wing of the aircraft and often need access to the entire surface area of the wing of the aircraft. Typically, boom and scissor lifts are used in the aircraft MRO industry, but such lifts are prone to equipment failure. Due to the need for close proximity between equipment and the aircraft wing being serviced to perform MRO activities and the high risk of operator error, conventional boom and scissor lifts may also potentially result in damage to the wing of the aircraft being serviced due to collision.

Roof and/or ceiling mounted systems are expensive to install and have other shortcomings. For example, in some ceiling mounted systems, workers may have to attach themselves to a cable or rope support system attached to the ceiling in order to have access to the top surface of an aircraft wing. This can be dangerous for the workers and may also limit the mobility of the workers, since the workers may need to detach and re-attach from the ceiling mounted system in order to move along the length of the wing of the aircraft.

The disclosed embodiments eliminate the use of boom lifts, scissor lifts, and roof/ceiling mounted systems and reduce the problems associated therewith. The disclosed embodiments facilitate multi-directional movement of personnel at an optimum working distance from the surface of a wing of an aircraft, which allows controlled access to all wing surfaces for servicing the wing, such as sanding and painting, thus providing better production efficiency and higher quality results. The disclosed embodiments also greatly improve the safety of personnel performing MRO activities on wings of aircrafts and reduce risk of collision.

The proposed structure of the disclosed embodiments is designed to be moveable and to surround at least part of a wing of an aircraft, thereby providing total or major perimeter surface access to many or all underwing and overwing surfaces, including the leading and trailing edges of the wing. The proposed design allows personnel to perform a series of aircraft wing maintenance services, such as sanding, painting, inspections and repairs. The characteristics of the proposed design are customizable to various aircraft body and wing styles and sizes. The floor supported wing gantry system is a simple alternative to using boom and scissor lifts or roof-mounted systems. The disclosed aircraft wing gantry and aircraft wing gantry system are designed to improve operator safety and job efficiency.

The drawings are not necessarily to scale. Thus, the proportions of the disclosed aircraft wing gantry and the relative positions of the various features and elements of the aircraft wing gantry and aircraft wing gantry system can vary from the examples shown and described herein. The use of terms herein, such as "top," "bottom," "left," "right," "upper," "lower," "lowered," "raised," "inner," "outer," "first," "second," and the like are meant only to differentiate among elements having similar names or different positions. Such terms are not intended to limit the scope of such elements to a particular order, side, height, orientation, position, or the like, except where expressly and specifically stated.

The terms forward, rearward, front, rear, side, top, bottom, underside, and the like are used herein merely for reference and are not intended to limit in any way the specific position or particular orientation of any components of the aircraft gantry. Similarly, aviation terminology, such as aircraft, nose, fuselage, wing, tail, leading edge, trailing edge, chord, span, inboard, and outboard is used herein merely for reference and is not intended to limit in any way the specific position or particular orientation of any components of the aircraft wing gantry.

It is to be understood that elements and features of the various representative embodiments described below may be combined in different ways to produce new embodiments that likewise fall within the scope of the present teachings.

Turning now to the drawings, FIGS. 1-5 illustrate various aspects of an exemplary wing gantry 100 for servicing a wing 102 of an aircraft. The wing 102 may be a wing 102 of an airplane and generally includes a leading edge 104, a trailing edge 106, a top surface 108, a bottom surface 110, and a chord, or width 112, which is a distance measured from the leading edge 104 to the trailing edge 106. While a wing 102 of an airplane is shown in the Figures, the disclosed wing gantry 100 may be configured for performing MRO activities on any type of similarly shaped structure. For example, the exemplary wing gantry 100 may be used to service any large, rigid, substantially flat, elongated member anchored at one end to a support from which it protrudes (i.e., cantilever).

Figure 1:
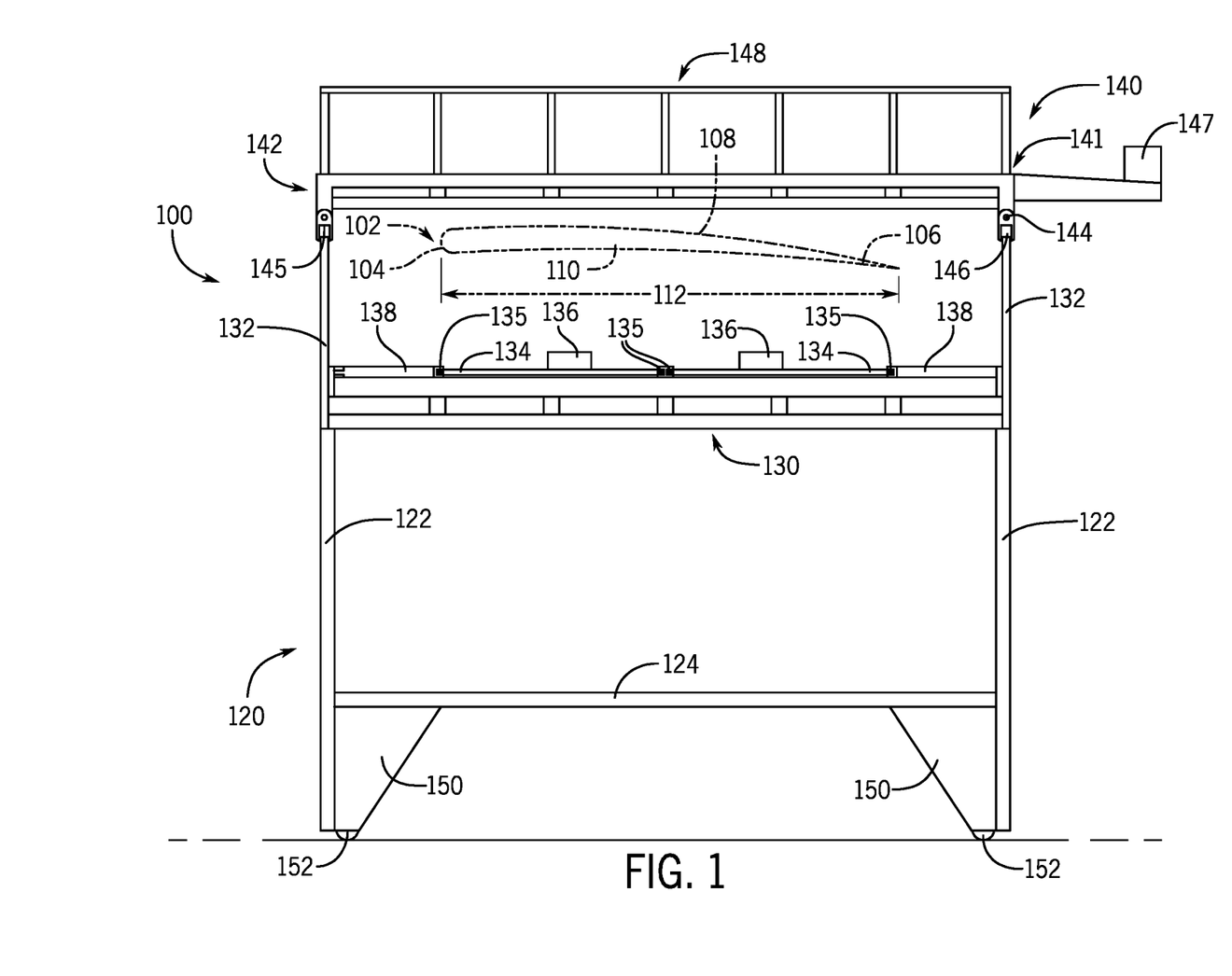
FIG. 1 is a cross-section view of an exemplary aircraft wing gantry.

FIG. 1 is a cross-section view of an exemplary aircraft wing gantry 100. As shown in FIG. 1, the wing gantry 100 generally includes a moveable support 120, or support structure 120, that supports a service deck 130 and a span platform 140. The moveable support structure 120 of the wing gantry 100 generally includes frame members 122 and a base 124. The moveable support structure 120 may include upright frame members, such as frame members 122, and may also include lateral frame members (not shown), where the lateral frame members span across the frame members 122 to connect and support the frame members 122. Other configurations are possible. For example, the moveable support structure 120 of the wing gantry 100 may include angled frame members as well or instead of lateral frame members.

The moveable support structure 120 of the wing gantry 100 is generally a rigid frame system, such as a scaffolding type of structure described above. However, other types of structures are possible to support the service deck 130 and span platform 140. For example, the moveable support structure 120 of the wing gantry 100 may be a single piece of material that is rigid and strong enough to support the service deck 130 and span platform 140. The moveable support structure 120, the service deck 130, and the span platform 140 may be constructed out of any material, but a material that is lightweight, easy to form, and has a high strength-to-weight ratio is preferable. In one example, the moveable support structure 120, the service deck 130, and the span platform 140 may be constructed out of aluminum tube material. In another example, magnesium or titanium may be used.

The moveable support structure 120 of the wing gantry 100 may also include a wheel assembly 150 to allow the support structure 120 to be moved and positioned around the wing 102 of the aircraft. The wheel assembly 150 may include a wheel 152 and a locking mechanism (not shown). The wheel 152 may be a heavy wheel designed to support the wing gantry 100. The wheel assembly 150 may be vertically adjustable to allow for leveling of the moveable support structure 120. Any type of wheel assembly 150 having a wheel 152 with locking and leveling mechanisms may be used. In one embodiment, the wheel 152 may be a vertically adjustable wheel 152 and the wheel assembly 150 may be a leveling caster with integrated lock. In this example, the wheel assembly 150 may be a leveling caster with a fixed foot and height adjustable wheels 152. In another example, the wheel assembly 150 may be a leveling caster with an integrated hydraulic pump to hydraulically actuate a lock and lift the caster. In this regard, the moveable support structure 120 may include a plurality of casters (i.e., one in each corner) that may be lifted synchronously and silently using the integrated hydraulic pump.

The service deck 130 may be attached to the moveable support 120 and configured to be positioned underneath the wing 102 of the aircraft. The service deck 130 may include a rail or railing 132 along a length of the service deck 130. In one embodiment, the service deck 130 includes two railings 132, one on opposite sides of the service deck 130 such that the two railings 132 are opposing each other. The service deck 130 may also include an operator platform 134 moveably attached to the service deck 130 and operable to translate along the length of the service deck 130. The operator platform 134 may be moveably attached to the service deck 130 via tracks 135, as will be discussed in more detail below with regard to FIG. 2.

The service deck 130 may also include a chair support 136 moveably mounted to the operator platform 134 and operable to translate across the operator platform 134 in a direction substantially perpendicular to the length of the service deck 130, such that the chair support 136 provides access to different positions underneath the wing 102 of the aircraft. In this regard, the chair support 136 in conjunction with the operator platform 134 provides an operator (not shown) controlled access to all portions of the bottom surface 110 of the wing 102 of the aircraft. As used herein, operator may mean any type of personnel or worker who uses the service deck 130, span platform 140, chair support 136, and/or any other part of the aircraft wing gantry 100. A robot may be provided instead of a person as the operator.

The service deck 130 may also include a perimeter walkway 138 adjacent the railing 132 or railings 132 of the service deck 130. The perimeter walkway 138 may be designed and sized to accommodate an operator to perform service on the wing 102 of the aircraft by allowing an operator to be positioned near the ends, or edges, of the wing 102, such as the leading edge 104 and the trailing edge 106. While a perimeter walkway 138 is disclosed and shown, the entire surface of the service deck 130 may be walkable, including the areas underneath the operator platform 134 and chair support 136.

The service deck 130 of the aircraft wing gantry 100 also includes a span platform 140 configured to be positioned above the wing 102 of the aircraft and span across a width 112, or chord, of the wing 102 of the aircraft. The span platform 140 may be hingedly attached to the railing 132 of the service deck 130 and operable to translate along the railing 132, such that the span platform 140 provides access to different positions above the wing 102 of the aircraft. As discussed above and as shown in FIG. 1, the service deck 130 of the wing gantry 100 may include two opposing railings 132, one on opposite sides of the service deck 130. In this example, the wing 102 of the aircraft is positioned in between the opposing railings 132 of the service deck 130.

As shown in FIG. 1, the span platform 140 includes a first end 141 and a second end 142. In one embodiment, the first end 141 of the span platform 140 is hingedly attached to one of the opposing railings 132. As used herein, hingedly describes something that is hinged or joined to another thing by a hinge, pivot, pin, rod, shaft, etc., and may also be referred to as tiltably attached, pivotably attached, or the like. In one example, the first end 141 of the span platform 140 may include a swing pin 144 or pivot 144 upon which the span platform 140 tilts, pivots, or swings from a raised position to a lowered position. In this example, when the span platform 140 is in the raised position, the second end 142 of the span platform 140 may be positioned substantially vertical above the first end 141 of the span platform 140. When the span platform 140 is in the lowered position, the second end 142 of the span platform 140 may span across the width 112 of the wing 102 and the width of the service deck 130 and engage the other railing 132 of the service deck 130. In this example, the second end 142 of the span platform 140 may include a bearing surface 145 that bears down on, and engages, the railing 132 of the service deck 130.

The span platform 140 may be operable to translate along the railings 132 of the service deck 130. In one embodiment, the first end 141 of the span platform 140 may also include a linear bearing 146 that allows the span platform 140 to move along the railing 132 of the service deck 130. In one example, the linear bearing 146 may be a roller bearing. Other types of linear bearings, roller mechanisms, or linear actuators may be used. For example, track rollers, cam rollers, track and gear systems, screw drive systems, chain and belt drive systems, wheel and rail systems, linear gliding systems, or rack and pinion systems may be used. In one embodiment, the bearing surface 145 of the second end 142 of the span platform 140 may also include a linear bearing. In another embodiment, the bearing surface 145 of the second end 142 of the span platform 140 may not have a linear bearing, but may be designed to engage with the railing 132 of the service deck 130 in such a way to allow the second end 142 of the span platform 140 to move along the railing 132 of the service deck 130. In this regard, as the span platform 140 translates along the railings 132, the span platform 140 moves along the length of the service deck 130 and provides access to different positions above the wing 102 of the aircraft. For example, an operator on the span platform 140 may access any position along both the length and the width 112 of the wing 102 of the aircraft that is surrounded by the wing gantry 100.

As the span platform 140 translates or moves along the length of the service deck 130, operators on the service deck 130, especially on the perimeter walkway 138, may need to duck underneath the span platform 140, depending on the height of the railings 132 of the service deck 130 and/or the height of the operator.

Figure 5:
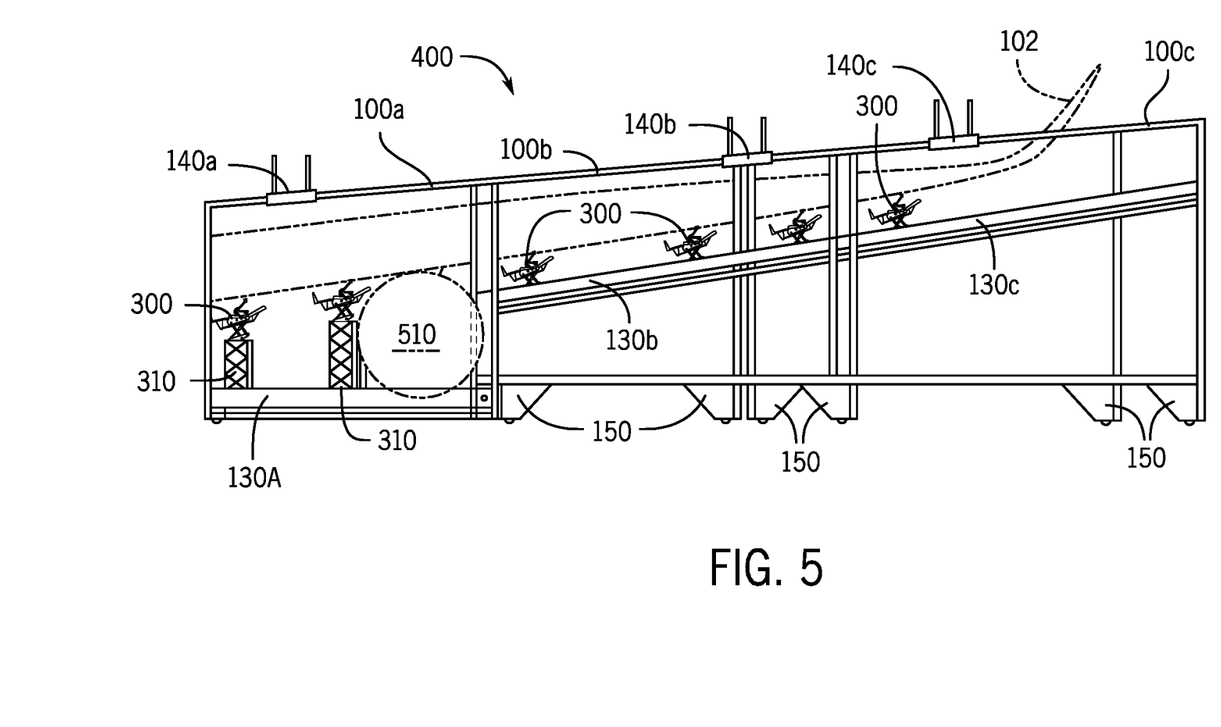
FIG. 5 is a side elevation view of the aircraft wing gantry system of FIG. 4.

The span platform 140 may also include a counterweight 147 to counteract the weight of the span platform 140. In one embodiment, the counterweight 147 may be positioned at one end of the span platform 140, such as the first end 141 of the span platform 140. In this example, the counterweight 147 is positioned adjacent the swing pin/pivot 144. In this regard, the counterweight 147 allows for a more controlled movement of the span platform 140 between the raised position and the lowered position. The counterweight 147 allows the span platform 140 to tilt up to the raised position when removing or installing the wing gantry 100 to surround the wing 102 of the aircraft. In this regard, damage to the wing 102 of the aircraft is avoided, especially at the end or tip of the wing 102 (i.e., winglet), which generally curves upward, as shown in FIG. 5 below. In one example, the counterweight 147 may be adjustable to allow weight to be added or removed, depending on a counterbalance force needed. The counterweight 147 may be any material, such as lead, steel or concrete.

The span platform 140 may also include handrails 148 on either side of the span platform 140 for use by workers. For example, workers may attach themselves to a cable or rope support system attached to the handrails 148 in order to safely secure themselves to the span platform 140 while performing maintenance or repairs to the top surface 108 of the wing 102 of the aircraft. In this regard, the span platform 140 may also include rails or hooks for securing the operator to the span platform 140, such as connection points (not shown) for attaching ropes, cables, or safety harnesses between the operator and the span platform 140. Workers on the span platform 140 may need to sit, kneel, or bend over on the span platform 140 in order to reach the top surface 108 of the wing 102.

As discussed above, the span platform 140 may be a rolling platform designed to utilize the railing 132 of the service deck 130 adjacent the perimeter walkway 138. The span platform 140 may be rolled, guided, or otherwise controlled along the railings 132 of the service deck 130 either manually, such as by pushing or pulling by an operator, or with an explosion proof power source, such as by a pneumatic motor and/or a hydraulic power source. The span platform 140 may also include locking mechanisms (not shown) for locking the span platform 140 in place once positioned. The locking mechanisms would avoid unwanted movement of the span platform 140, such as the span platform 140 rolling along the railing 132 of the service deck 130 unintentionally.

The wing gantry 100 may be custom configured for different types and models of aircraft wings 102. Since specific aircraft wings may have different sizes and configurations, such as wingspan, wing sweep angle, chord length, span length, and wing tip size/angle, different configurations of wing gantries 100 may be used. In this regard, the wing gantry 100 may be geometrically coordinated to a specific aircraft wing model or class of models. Similarly, the service deck 130, including railing(s) 132, operator platform(s) 134, chair support(s) 136, perimeter walkway(s) 138, and span platform 140 may also be custom configured to allow access for transverse (i.e., lateral, or along the width) and linear (i.e., longitudinal, or along the length) maintenance and repair operations across the span of the wing 102, such as sanding and painting.

In one embodiment, as shown in FIG. 1, the service deck 130 of the wing gantry 100 may be designed and configured to have two operator platforms 134 and two chair supports 136, each running on their own set of tracks 135. This exemplary configuration allows two workers to work on the bottom surface 110 of the wing 102 simultaneously, providing two-directional air operated movement of workers. This allows multiple workers to travel in multiple directions at an optimum working distance from a respective half of the bottom surface 110 of the wing 102 simultaneously. In another embodiment, the service deck 130 of the wing gantry 100 may include a single operator platform 134 and a single chair support 136, where the single operator platform 134 operates on a single set of tracks 135. In this example, the single operator platform 134 may span the entire width 112 of the wing 102 and provide access to the entire bottom surface 110 of the wing 102 from the leading edge 104 to the trailing edge 106 of the wing 102. Other configurations are possible. For example, in another embodiment, the chair support 136 is not provided and workers may stand, kneel, sit, lay, or otherwise position themselves at various locations along the operator platform 134 to access different parts of the bottom surface 110 of the wing 102 along the width 112 of the wing 102 as the operator platform 134 moves along the length of the wing 102.

Figure 2:
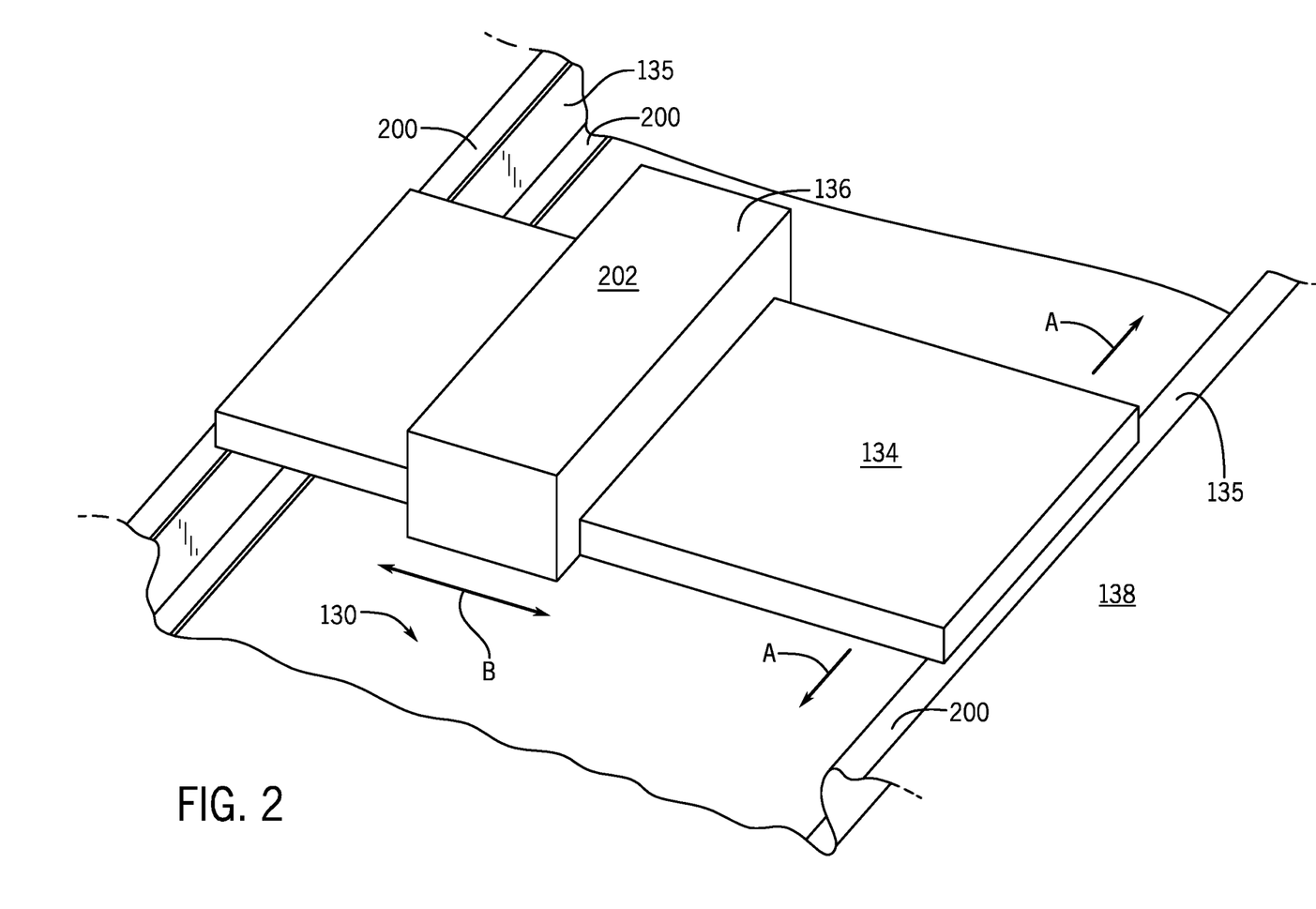
FIG. 2 is a perspective view of an exemplary operator platform and chair support of the aircraft wing gantry of FIG. 1.

FIG. 2 is a perspective view of an exemplary operator platform 134 and chair support 136 of the aircraft wing gantry 100 of FIG. 1. As shown in FIG. 2, the operator platform 134 may be moveably attached to the service deck 130 via tracks 135. In one example, the tracks 135 may be linear gear tracks 135 that correspond to and engage with gears (not shown) of the operator platform 134. Other types of tracks 135 are possible. While tracks 135 are shown in FIG. 2, the operator platform 134 may translate along the service deck 130 by any means available, such as linear bearings, roller mechanisms, wheels, or linear actuators, as discussed above. In one embodiment, the operator platform 134 may translate on tracks 135 that run lengthwise along the service deck 130 in direction A. In this example, the length of the service deck 130 corresponds to a span, or length, of the wing 102. In the example shown in FIG. 2, the tracks 135 may be mounted under flanges 200. As discussed above, either one or both of the tracks 135 may be positioned adjacent a perimeter walkway 138, depending on whether the service deck 130 includes a single operator platform 134 or multiple operator platforms 134.

The operator platform 134 may be controlled by a controller to move the operator platform 134 in direction A forward and backward along the length of the service deck 130. In one example, the controller may include an explosion proof power source, such as a pneumatic motor and/or a hydraulic power source. In one example, the operator platform 134 may be controlled by parallel pneumatic motor and shaft that drives the corresponding gears and tracks 135 to allow the operator platform 134 to translate along the length of the service deck 130. In this regard, the tracks 135 provide the gear-driven travel for the operator platform 134.

As shown in FIG. 2, a chair support 136 may be moveably mounted to the operator platform 134. In one embodiment, the chair support 136 has its own lateral gear-driven system that allows the chair support 136 to move from side to side in direction B across the operator platform 134. In another embodiment, the chair support 136 may translate across the operator platform 134 by various devices, such as linear bearings, roller mechanisms, or linear actuators, as discussed above.

As shown in FIG. 2, the direction of movement B of the chair support 136 is substantially perpendicular to the direction of movement A of the operator platform 134. In this regard, the operator platform 134 may move along the span (length) of the wing 102 (and service deck 130) while the chair support 136 may move along the chord (width) of the wing 102 (and service deck 130). Thus, each of the chair support 136 and span platform 140 provides access to different positions underneath and above the wing 102 of the aircraft, respectively, along both a length and the width 112 of the wing 102 of the aircraft.

In one embodiment, the chair support 136 may be designed and configured to support a chair on a top surface 202 of the chair support 136. For example, a chair or seat may be bolted, welded, or otherwise affixed to the top surface 202 of the chair support 136. In this example, the chair may be designed to accommodate an operator/worker to perform maintenance and/or repair to the wing 102 of the aircraft. In another embodiment, the top surface 202 of the chair support 136 may be a flat surface that allows workers to stand, kneel, sit, lay, or otherwise position themselves at various locations on the chair support 136 to access different parts of the bottom surface 110 of the wing 102 along the width 112 of the wing 102 as the chair support 136 moves along direction B across the width 112 of the wing 102.

Figure 3A:
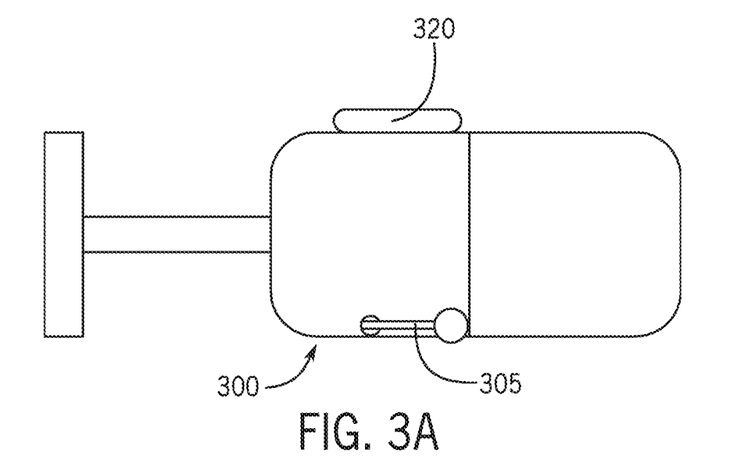
FIGS. 3A and 3B illustrate an exemplary chair of the aircraft wing gantry of FIG. 1.
Figure 3B:
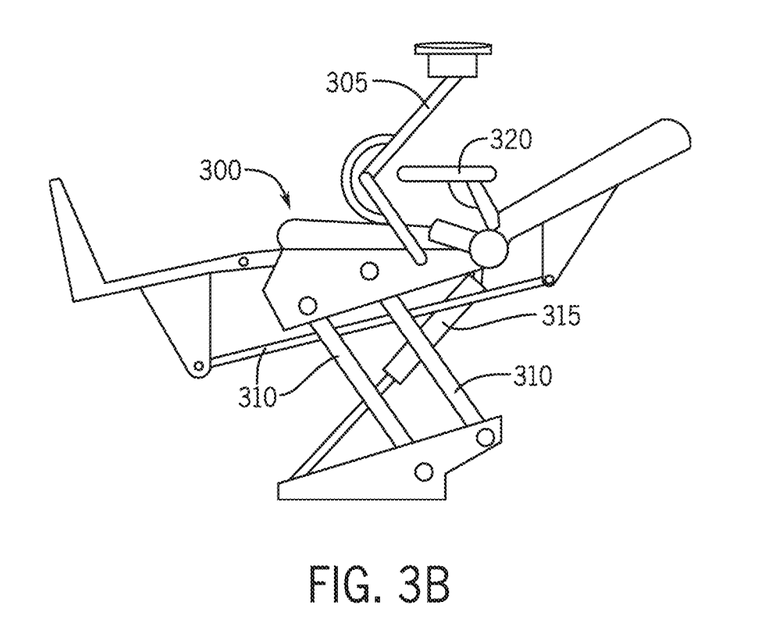

FIGS. 3A and 3B illustrate an exemplary chair 300 of the aircraft wing gantry 10 of FIG. 1. As discussed above, the wing gantry 100 may also include a chair 300 attached to the chair support 136. The chair 300 may be multidirectional and vertically adjustable, such that the chair 300 is operable to swivel, tilt, recline, raise, lower, or combinations thereof. In one example, the chair 300 may include an adjustable tension arm 305 configured to accommodate tools for servicing the wing 102 of the aircraft. For example, the adjustable tension arm 305 of the chair 300 may be configured to hold a dual action sander (not shown). In this example, the dual action sander mounted to the adjustable tension arm 305 of the chair 300 may relieve the pressure load requirement from workers operating the dual action sander. The adjustable tension arm 305 of the chair 300 may be configured to hold other tools as well, such as painting or other maintenance/repair apparatuses.

The chair 300 may be configured to allow for vertical adjustment of the chair 300 via cantilever angle of control arms 310 with air controls 315 that are ram mounted strategically at an angle to provide ease of height adjustment. The chair 300 may be adjusted vertically to varying heights. In one example, the chair 300 may adjust between 18 and 36 inches. In another example, the chair 300 may adjust between 18 and 74 inches. The chair 300 may also include a master control for all directions of movement mounted on one or both chair arms 320.

As discussed above, the wing gantry 100 may include a controller (not shown) to control the operator platform 134, the chair support 136, the span platform 140, the chair 300 (including the adjustable tension arm 305), or combinations thereof. For example, movement of the operator platform 134 in direction A forward and backward along the length of the service deck 130, movement of the chair support 136 from side to side in direction B across the operator platform 134, or movement of the chair to swivel, tilt, recline, raise, or lower, as described above may be controlled by any type of controller operating one or more motors. In another example, movement of the span platform 140 from a raised position to a lowered position, or vice versa, may also be controlled by any type of controller. However, due to the possible presence of ignitable concentrations of flammable liquids, gases, or vapors that may exist because of repair or maintenance operations, such as in and around fuel tanks of aircrafts, the motor in the disclosed embodiments is an explosion proof power source. In one example, the explosion proof power source is a pneumatic or air motor. The pneumatic or air motor may include a speed reducer. In another example, the explosion proof power source is a hydraulic power source. In yet another example, explosion proof electric motors may be used. Other types of explosion proof power sources, now known or later developed, may be used as well. In one example, a combination of explosion proof power sources may be used, such as an air over hydraulic system.

Figure 4:
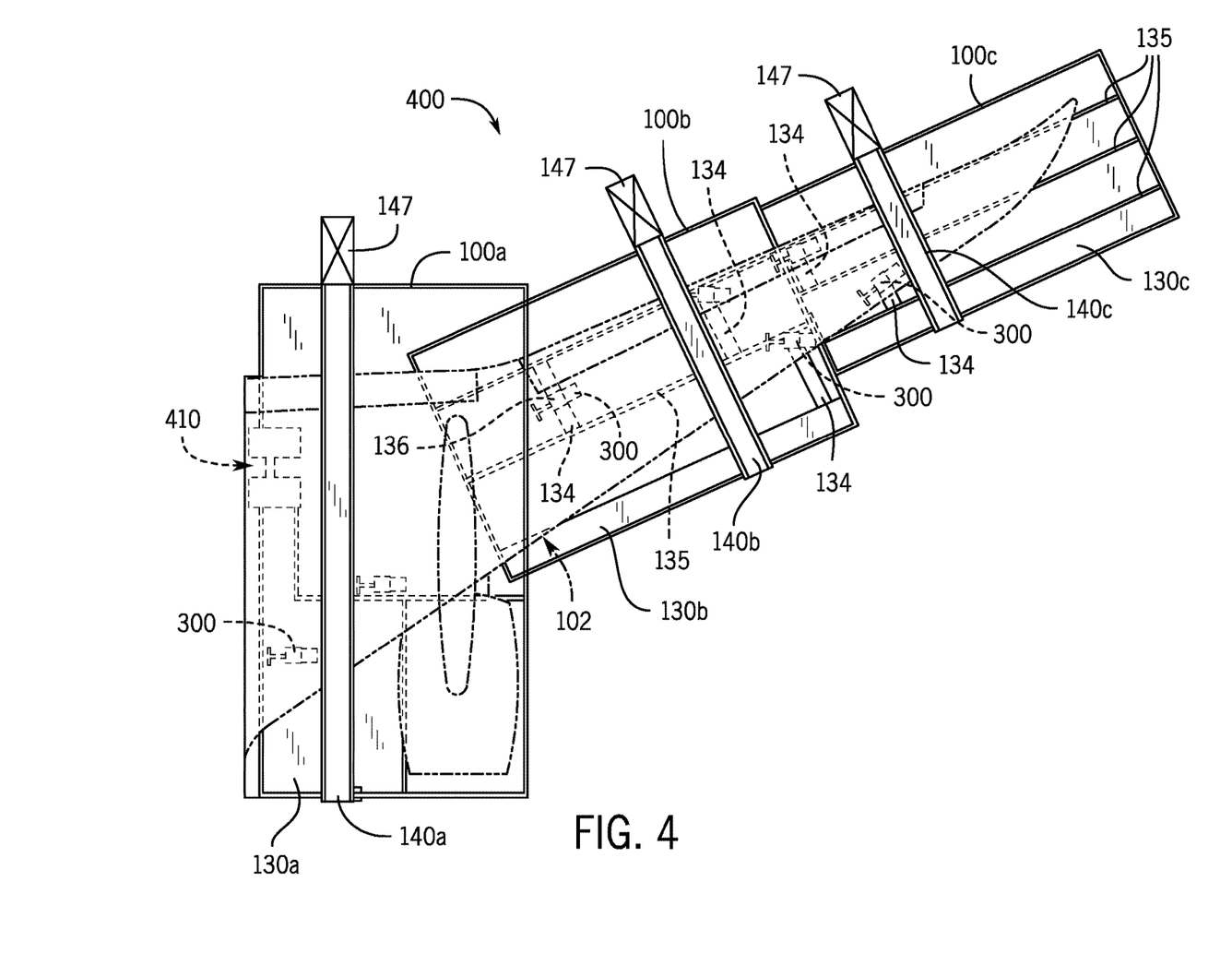
FIG. 4 is a top plan view of an exemplary aircraft wing gantry system.

FIG. 4 is a top plan view of an exemplary aircraft wing gantry system 400. As shown in FIG. 4, the aircraft wing gantry system 400 includes a plurality of gantries 100a-c configured to be positioned around a wing 102 of an aircraft, such that the plurality of gantries 100a-c provide access to overwing and underwing surfaces of the wing 102 of the aircraft. The plurality of gantries 100a-c may be designed and configured the same as the wing gantry 100 disclosed above with regard to FIGS. 1 and 2. Other gantry designs and configurations may be possible for different parts of the wing 102 of the aircraft, as will be discussed below.

The aircraft wing gantry system 400 also includes a service deck 130 attached to at least one gantry 100 of the plurality of gantries 100a-c. The service deck 130 may be configured to be positioned underneath the wing 102 of the aircraft, such that the service deck 130 provides access to the underwing surfaces of the wing 102 of the aircraft. The service deck 130 of the aircraft wing gantry system 400 may be designed and configured the same as the service deck 130 disclosed above with regard to FIGS. 1 and 2. Other deck designs and configurations are possible for different parts of the wing 102 of the aircraft, as will be discussed below.

In one embodiment, the service deck 130 of the aircraft wing gantry system 400 may include an operator platform 134 moveably attached to the service deck 130 and operable to translate along a length of the service deck 130. The operator platform 134 of the aircraft wing gantry system 400 may be designed and configured the same as the operator platform 134 disclosed above with regard to FIGS. 1 and 2.

In one embodiment, the service deck 130 of the aircraft wing gantry system 400 may include a chair support 136 moveably mounted to the operator platform 134 and operable to translate across the operator platform 134 in a direction substantially perpendicular to the length of the service deck 130, such that the chair support 136 provides access to different positions of the underwing surfaces of the wing 102 of the aircraft. The chair support 136 of the aircraft wing gantry system 400 may be designed and configured the same as the chair support 136 disclosed above with regard to FIGS. 1 and 2.

In one embodiment, as shown in FIG. 4, the service deck 130 of the aircraft wing gantry system 400 may be designed and configured to have two operator platforms 134 and two chair supports 136, each running on their own set of tracks 135. In this example, there may be only two workers on the service deck 130. In another embodiment, the service deck 130 of the aircraft wing gantry system 400 may be designed and configured to have a single operator platform 134 and a single chair support 136 running on a single set of tracks 135. In this example, there may be a single worker on the service deck 130. However, additional workers may be possible in each case, such as workers on the perimeter walkway 138.

The aircraft wing gantry system 400 also includes a platform 140 tiltably attached to the service deck 130 of the at least one gantry 100. The platform 140 may be tiltable between a raised position and a lowered position, such that when the platform 140 is in the raised position the at least one gantry 100 is operable to be positioned around the wing 102 of the aircraft and when the platform 140 is in the lowered position the platform 140 provides access to the overwing surfaces of the wing 102 of the aircraft. When the platform 140 is in the lowered position the platform 140 is configured to span across a width of the service deck 130 and move along a length of the service deck 130.

The platform 140 of the aircraft wing gantry system 400 may be designed and configured the same as the span platform 140 disclosed above with regard to FIGS. 1 and 2. However, other platform 140 designs and configurations are possible for different parts of the wing 102 of the aircraft, as will be discussed below. For instance, as discussed above, the platform 140 may be custom designed for a particular length depending on the size of the wing 102 over which the platform 140 spans. This allows for complete access, both laterally and longitudinally, across the width 112 of the wing 102.

The aircraft wing gantry system 400 also includes a plurality of wheels attached to the plurality of gantries 100a-c such that the plurality of gantries 100a-c are moveable to surround the wing 102 of the aircraft. The wheels of the plurality of gantries 100a-c may be designed and configured the same as the wheels 280 disclosed above with regard to FIG. 2.

The aircraft wing gantry system 400 may include an explosion proof power source (not shown) operable to control movement of the operator platform 134 and chair support 136. The explosion proof power source may also be operable to control movement of the platform 140 along a length of the service deck 130. As discussed above, the explosion proof power source may be a pneumatic or air motor and may include a speed reducer. In another example, the explosion proof power source may be a hydraulic power source. In yet another example, explosion proof electric motors may be used. Other types of explosion proof power sources, now known or later developed, may be used as well. Combinations of any of these explosion proof power sources may be used. In one example, an air over hydraulic system may be used. In another example, a different power source may be used for different parts of the system 400. For instance, a pneumatic or air motor may be used to control movement of the platform 140 along a length of the service deck 130 and a hydraulic power source may be used to control the movement of the operator platform 134 along the length of the service deck 130 and movement of the chair support 136 across the operator platform 134. In one example, the platform 140 may be moved manually without the need of an explosion proof power source.

As indicated above, some gantries 100 of the plurality of gantries 100*a-c* may be designed and configured differently for different portions of the wing 102 of the aircraft. In one embodiment, the aircraft wing gantry system 400 includes an inboard gantry 100*a* and an outboard gantry 100*b*. The inboard gantry 100*a* may be positioned adjacent a fuselage of the aircraft. The outboard gantry 100*b* may be positioned adjacent the inboard gantry 100*a* in a direction away from the fuselage and along a length of the wing 102 of the aircraft. In another embodiment, the aircraft wing gantry system 400 includes an inboard gantry 100*a* and at least two outboard gantries 100*b-c*, as shown in FIG. 4. In this embodiment, the inboard gantry 100*a* and the outboard gantries 100*b-c* may be coupled together, such as using releasable latches or bolts. The different gantry sections 100*a-c* may also be locked together, such as with alignment pins and cam locks.

In the example shown in FIG. 4, the inboard gantry 100*a* and/or the outboard gantry 100*b* may be designed and configured to allow a portion of the outboard gantry 100*b* to cooperate (i.e., fit within, mesh, or overlap) with a portion of the inboard gantry 100*a*. In this example, the two outboard gantries 100*b-c* may be similar in design and configuration other than basic dimensions and the outboard gantry 100*c* may be positioned directly adjacent and abut the outboard gantry 100*b*.

In one example, each of the inboard gantry 100*a* and the at least two outboard gantries 100*b-c* may have respective platforms 140*a-c* and service decks 130*a-c* designed and configured as discussed above. The respective service decks 130*a-c* may also include respective operator platforms 134, chair supports 136, and chairs 300 designed and configured as discussed above. When the plurality of gantries 100*a-c* are coupled and/or locked together, workers are able to access overwing and underwing surfaces along the entire length of the wing 102 of the aircraft simultaneously. This facilitates coordinated movement of personnel and maintenance/repair along the wing 102 of the aircraft, thereby allowing synchronized linear servicing, such as painting. This type of coordinated movement provides better production efficiency and higher quality results.

Regulations may prohibit apparatuses such as the disclosed wing gantries 100*a-c* from mechanically attaching to an aircraft to prevent damage to the aircraft. However, attachment to rubber tires of an aircraft's landing gear may be acceptable. In one embodiment, the inboard gantry 100*a* may be configured to be removably attached to an underwing landing gear 410 of the aircraft, such that the underwing landing gear 410 provides alignment for the inboard gantry 100*a*. In this example, as shown in FIG. 4, the inboard gantry 100*a* may surround three sides of the landing gear 410 and may be secured to the landing gear 410 for strength and alignment. In one example, the inboard gantry 100*a* may be secured to the landing gear 410 using a basic screw clamp system that is attached to the rubber tires of the landing gear 410. Other methods of securing the inboard gantry 100*a* to the landing gear 410 may be used. The alignment of the inboard gantry 100*a* may also provide alignment for the outboard gantries 100*b-c*.

Other methods of alignment, such as floor tracks, may be used. Use of floor tracks may involve the use of stops or anchors. However, the use of floor tracks may not be as portable as the use of the aircraft wing gantry system 400 disclosed herein.

FIG. 5 is a side elevation view of the aircraft wing gantry system 400 of FIG. 4. As shown in FIG. 5, due to the presence of the engine 510 of the aircraft, the inboard gantry 100*a* may be designed and configured with a service deck 130*a* positioned lower than the service decks 130*b-c* of the outboard gantries 100*b-c*. The lower service deck 130*a* of the inboard gantry 100*a* allows the inboard gantry 100*a* to be positioned below and/or around both the engine 510 and landing gear 410.

The inboard gantry 100*a* and the outboard gantries 100*b-c* all operate with multiple linear gear tracks, such as the tracks 135 discussed above, running lengthwise inboard to outboard along the span (i.e., length) of the wing 102. As shown in the example of FIG. 5, the service decks 130*b-c* of the outboard gantries 100*b-c* may be angled or sloped to correspond to the angle or slope of the wing 102 of the aircraft. In this configuration, the chairs 300 of the service decks 130*b-c* of the outboard gantries 100*b-c* may not need to adjust much in the vertical direction since the service decks 130*b-c* follow the curvature of the wing 102. However, as shown in FIG. 5, the chairs 300 of the inboard gantry 100*a* may utilize a vertical chair adjustment, such as control arms 310, that allows the chairs 300 of the inboard gantry 100*a* to travel higher than the chairs 300 of the outboard gantries 100*b-c* since the service deck 130*a* of the inboard gantry 100*a* is not able to slope at an angle that follows the angle of the wing 102 as the service decks 130*b-c* of the outboard gantries 100*b-c* do. In one example, the chairs 300 of the outboard gantries 100*b-c* may adjust between 18 and 36 inches while the chairs 300 of the inboard gantry 100*a* may adjust between 18 and 74 inches.

Figure 6:
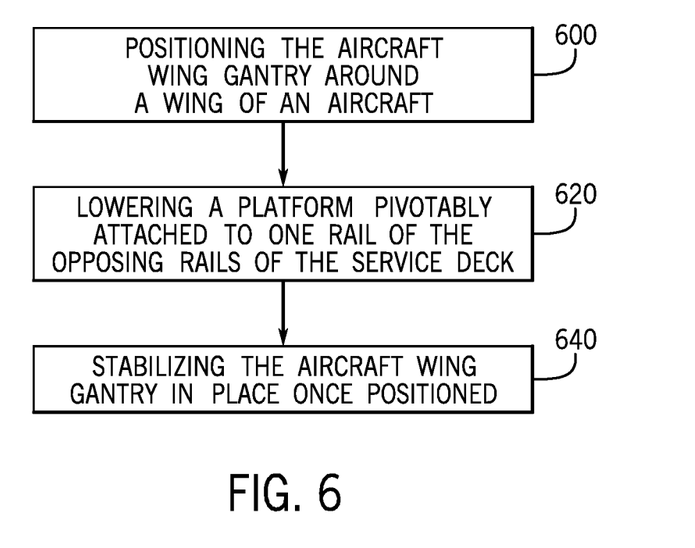
FIG. 6 illustrates a flow chart depicting one embodiment of a method for setting up an aircraft wing gantry.

FIG. 6 illustrates a flow chart depicting one embodiment of a method for setting up an aircraft wing gantry 100. The operation may be implemented using any gantry 100 of the plurality of gantries 100*a-c* described above. In other embodiments, a different gantry may be used. The method may be implemented in the order shown but may be implemented in or according to any number of different orders. For example, stabilizing the aircraft wing gantry (act 640) may be performed before lowering the platform (act 620). Additional, different, or fewer acts may be provided. For example, positioning the aircraft wing gantry around a wing of an aircraft (act 600) may be performed any number of times. As another example, acts 600-640 may be repeated for additional gantries and the additional act of coupling and/or locking the different gantries together may be added.

The method for setting up an aircraft wing gantry 100 may include positioning the aircraft wing gantry 100 around a wing 102 of an aircraft (act 600). In this example, a service deck 130 of the aircraft wing gantry 100 may be positioned underneath the wing 102 of the aircraft and the wing 102 of the aircraft may be positioned in between opposing rails 132 of the service deck 130, as discussed above and as shown in FIG. 1. Positioning the aircraft wing gantry 100 around the wing 102 of the aircraft may include rolling the aircraft wing gantry 100 into place (i.e., into close proximity to or under the wing 102 of the aircraft) while prohibiting the wing gantry 100 from contacting the wing 102, thus preventing damage to the wing 102 caused by impact of the wing gantry 100 to the wing 102.

In one embodiment, the aircraft wing gantry 100 may be rolled into place utilizing wheels or a wheel assembly, such as the wheels 152 or wheel assembly 150 discussed above with regard to FIG. 1. In another embodiment, the aircraft wing gantry 100 may be rolled into place utilizing a preinstalled track system that is geometrically coordinated to the specific aircraft model. For example, positioning the aircraft wing gantry 100 may include moving the aircraft wing gantry 100 along a floor track system. In this example, the floor track system may include floor tracks that are angled with respect to a longitudinal axis of the aircraft.

Since the service deck 130 of the aircraft wing gantry 100 may include railings 132 that extend vertically from the top surface of the service deck 130, the aircraft wing gantry 100 may not be able to be positioned or rolled into place from any direction, since the railings 132 may collide with the wing 102 of the aircraft. In this case, the aircraft wing gantry 100 may need to be rolled into place starting at the end of the wing 102 (i.e., near the wing tip or winglet of the wing 102 that angles upwards). Once the wing 102 is positioned in between the opposing railings 132 of the service deck 130, the aircraft wing gantry 100 may be rolled along the length of the wing 102 towards the fuselage of the aircraft until the aircraft wing gantry 100 is in a desired location.

In another embodiment, the railings 132 of the service deck 130 may be removeable and the aircraft wing gantry 100 may be positioned by rolling the aircraft wing gantry 100 underneath the wing 102 from any direction. In yet another embodiment, the aircraft wing gantry 100 may be positioned by installing or assembling the aircraft wing gantry 100 at a desired location. In this example, rolling or moving the aircraft wing gantry 100 may not be necessary.

In one embodiment, blocks, stops, and/or pads (such as foam pads) may be provided to limit movement of the aircraft wing gantry 100 and avoid collisions between the aircraft wing gantry 100 and the wing 102, engine 510 and/or fuselage of the aircraft during positioning of the aircraft wing gantry 100 around the wing 102 of the aircraft.

In one example, the service deck 130 of the aircraft wing gantry 100 may include an operator platform 134 moveably attached to the service deck 130 and operable to move along a length of the service deck 130. In this example, the service deck 130 of the aircraft wing gantry 100 may also include a chair support 136 moveably mounted to the operator platform 134 and operable to move across the operator platform 134 in a direction substantially perpendicular to the length of the service deck 130.

The method for setting up an aircraft wing gantry 100 may also include lowering a platform 140 pivotably attached to one rail 132 of the opposing rails 132 of the service deck 130 (act 620). In this example, when the platform 140 is lowered the platform 140 is positioned above the wing 102 of the aircraft and spans across a width 112 of the wing 102 of the aircraft. In this example, the platform 140 is operable to translate along the opposing rails 132 of the service deck 130, as discussed above.

The method for setting up an aircraft wing gantry 100 may also include stabilizing the aircraft wing gantry 100 in place once positioned (act 640). In one embodiment, stabilizing the aircraft wing gantry 100 may include engaging a locking mechanism of the wheel assembly 150, as discussed above. Stabilizing the aircraft wing gantry 100 may also include surrounding three sides of the landing gear 410 of the aircraft with the aircraft wing gantry 100 and securing the aircraft wing gantry 100 to the landing gear 410 for strength and alignment. In this example, the inboard gantry 100a may surround and be secured to the landing gear 410 using a basic screw clamp system that is attached to the rubber tires of the landing gear 410, as discussed above. In another embodiment, stabilizing the aircraft wing gantry 100 may include using blocks, stops, and/or pads (such as foam pads). For example, travel stops and locks may be used that hold the aircraft wing gantry 100 in position. The travel stops and locks may include stops and locking pins at predetermined locations along a floor track system. Other stabilizing methods may be used.

The method for setting up an aircraft wing gantry 100 may also include powering the translation of the platform 140 along the opposing rails 132 of the service deck 130 with one or more explosion proof power sources, such as the exemplary explosion proof power sources discussed above.

The method for setting up an aircraft wing gantry 100 may also include powering the operator platform 134 moveably attached to the service deck 130 to move along a length of the service deck 130 with one or more explosion proof power sources and powering a chair support 136 moveably mounted to the operator platform 134 to move across the operator platform 134 in a direction substantially perpendicular to the length of the service deck 130 with one or more explosion proof power sources, such that the chair support 136 provides access to different positions underneath the wing 102 of the aircraft.

In one example, as discussed above, the aircraft wing gantry 100 may include a plurality of gantry sections 100a-c and a plurality of respective platforms 140a-c and service decks 130a-c. In this example, the method of setting up the aircraft wing gantry 100 may include positioning the inboard wing gantry 100a first by positioning the wing 102 of the aircraft in between the railings 132 of the service deck 130a of the inboard wing gantry 100a and rolling the inboard wing gantry 100a into position, such that the service deck 130a of the inboard wing gantry 100a is positioned underneath the wing 102 and engine 510 of the aircraft. In this example, the inboard wing gantry 100a is positioned such that a portion of the inboard wing gantry 100a surrounds at least three sides of the underwing landing gear 410 of the aircraft in order to align the inboard wing gantry 100a in place. The platform 140a of the inboard wing gantry 100a may be lowered and the inboard wing gantry 100a may be stabilized or locked in place.

Next, the outboard wing gantry 100b may be positioned such that the wing 102 of the aircraft is positioned in between the railings 132 of the service deck 130b of the outboard wing gantry 100b. The outboard wing gantry 100b may then be rolled along the length of the wing 102 until a portion of the outboard wing gantry 100b overlaps and interconnects with or fits within a portion of the inboard wing gantry 100a.

After the first outboard wing gantry 100b is positioned in place, another outboard wing gantry 100c may be rolled into place at the end of the wing 102 near the wing tip or winglet. The second outboard wing gantry 100c may abut the first outboard wing gantry 100b, such that no portions of either the first or second outboard wing gantries 100b-c overlap.

The plurality of wing gantries 100a-c may be locked into position and the respective platforms 140a-c may be lowered. The plurality of wing gantries 100a-c may then be supplied with explosion proof power and workers may then position themselves along the respective platforms 140a-c and service decks 130a-c of the respective wing gantries 100a-c.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. An apparatus for servicing a wing of an aircraft, the apparatus comprising:
   a moveable support;
   a service deck attached to the moveable support and configured to be positioned underneath the wing of the aircraft, the service deck comprising:
      a railing along a length of the service deck;
      an operator platform moveably attached to the service deck and operable to translate along the length of the service deck; and
      a chair support moveably mounted to the operator platform and operable to translate across the operator platform in a direction substantially perpendicular to the length of the service deck, such that the chair support provides access to different positions underneath the wing of the aircraft; and
   a span platform configured to be positioned above the wing of the aircraft and span across a width of the wing of the aircraft, the span platform being hingedly attached to the railing of the service deck and operable to translate along the railing, such that the span platform provides access to different positions above the wing of the aircraft.

2. The apparatus of claim 1, further comprising a chair attached to the chair support, the chair being multidirectional and vertically adjustable, such that the chair is operable to swivel, tilt, recline, raise, lower, or combinations thereof.

3. The apparatus of claim 1, wherein each of the chair support and span platform provides access to different positions underneath and above the wing of the aircraft, respectively, along both a length and the width of the wing of the aircraft.

4. The apparatus of claim 1, further comprising:
   a power source operable to control movement of the operator platform, the chair support, the span platform, or combinations thereof.

5. The apparatus of claim 4, wherein the power source is configured such that the power source will not ignite a surrounding flammable liquid, gas, vapor, or combinations thereof.

6. The apparatus of claim 5, wherein the power source comprises a pneumatic motor, an electric motor, a hydraulic power source, or combinations thereof.

7. The apparatus of claim 1, wherein the moveable support comprises a wheel assembly having a wheel and a locking mechanism, wherein the wheel assembly is vertically adjustable to allow for leveling of the moveable support.

8. The apparatus of claim 1, wherein the span platform includes a counterweight to counteract a weight of the span platform.

* * * * *